United States Patent [19]

Bjerklie

[11] Patent Number: 4,850,862

[45] Date of Patent: Jul. 25, 1989

[54] POROUS BODY COMBUSTOR/REGENERATOR

[75] Inventor: John W. Bjerklie, Upper St. Clair, Pa.

[73] Assignee: Consolidated Natural Gas Service Company, Inc., Pittsburgh, Pa.

[21] Appl. No.: 189,666

[22] Filed: May 3, 1988

[51] Int. Cl.$^4$ .............................................. F27D 17/00
[52] U.S. Cl. .................................. 432/182; 431/328; 431/170; 431/115; 432/181
[58] Field of Search .................. 431/7, 170, 328, 115, 431/116; 126/92 AC; 432/181, 182

[56] References Cited

U.S. PATENT DOCUMENTS

| | | | |
|---|---|---|---|
| 664,526 | 12/1900 | Blass | 432/181 |
| 1,790,172 | 1/1931 | Smith et al. | 432/182 |
| 1,805,001 | 5/1931 | Naismith et al. | 432/181 |
| 2,257,229 | 9/1941 | Drake | 432/181 |
| 3,797,231 | 3/1974 | McLean | 431/328 |
| 4,604,051 | 8/1986 | Davies et al. | 431/170 |
| 4,730,599 | 3/1988 | Kendall et al. | 431/328 |

FOREIGN PATENT DOCUMENTS 760273  5/1954  United Kingdom ................ 432/181

Primary Examiner—Albert J. Makay
Assistant Examiner—Denise L. Ferensic
Attorney, Agent, or Firm—Pearne, Gordon, McCoy & Granger

[57] ABSTRACT

A high efficiency, high temperature radiant heating system utilizing regeneratively coupled combustors. The combustor/regenerator units each comprise a porous body with combustion supported in one layered zone and regeneration occurring in an adjacent layered zone in a subsequent cycle. Each combustor/regenerator unit cycles between combustion and regeneration operational modes and is gas flow coupled with a similar unit operating simultaneously in a mode opposite that of the former. Heat in the combustion products produced at one combustor/regenerator unit is received at the regenerator zone of the other coupled unit and vice versa.

8 Claims, 4 Drawing Sheets

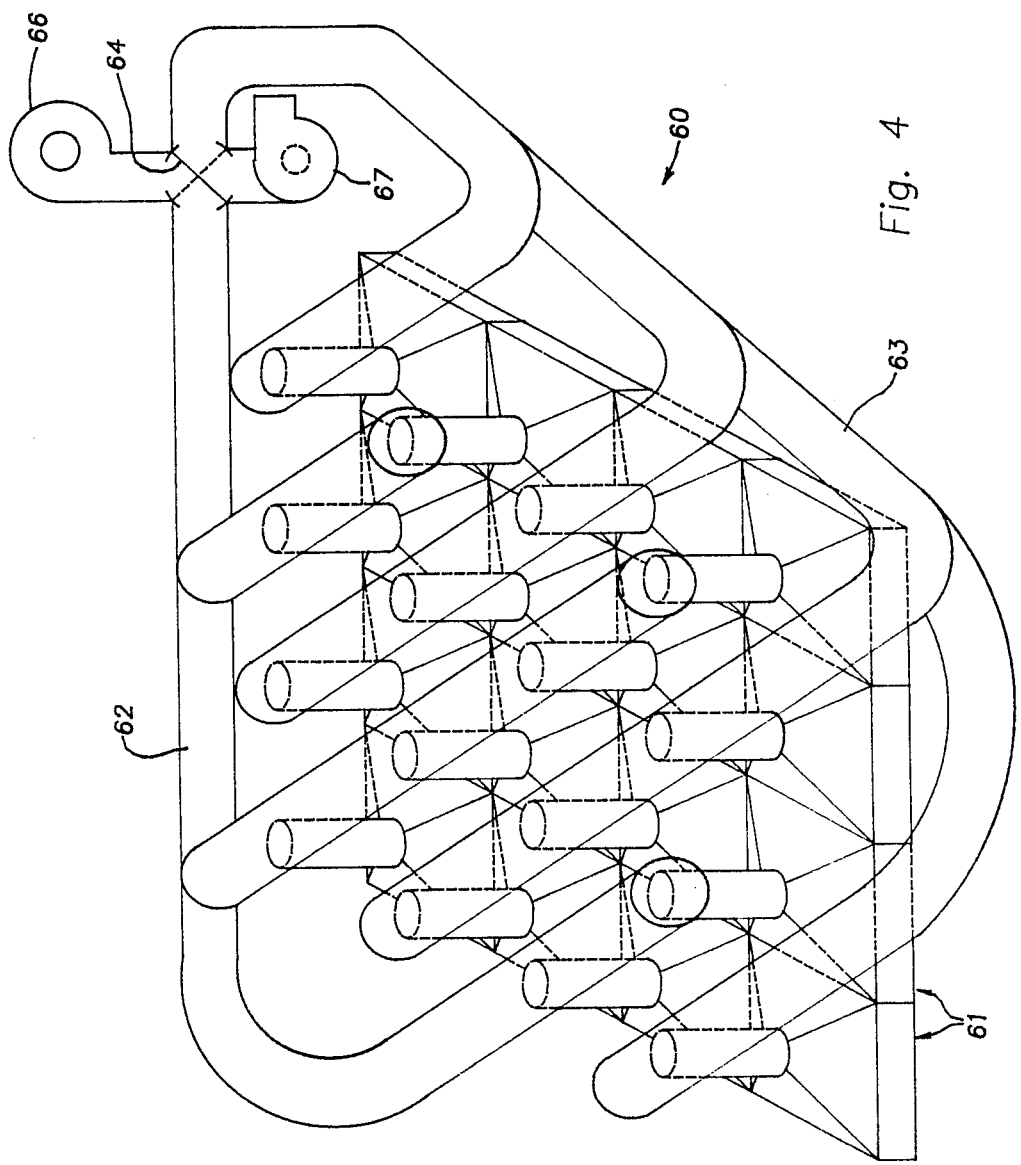

POROUS BODY COMBUSTOR/REGENERATOR

The invention relates to combustion systems and in particular to improvements in gaseous or vaporous fuel-fired radiant burner systems.

BACKGROUND OF THE INVENTION

In industrial applications such as in the field of large glass melting equipment, it is known to provide regenerative heating with a pair of burners and associated heat regenerating beds. The efficiency of these systems is generally improved over simpler systems without regenerative heating action.

It is also known, for example, from U.S. Pat. Nos. 3,751,213 to Sowards and 3,810,732 to Koch that porous plate-like high intensity radiant burners can be operated with gaseous or vaporous fuel.

SUMMARY OF THE INVENTION

The invention provides a radiant burner system characterized by both high temperature and high efficiency operation. The system includes paired or coupled sections, each section having series flow combustor and regenerator zones. In accordance with the invention, conduits and associated controls cyclically direct combustible gas to one combustor/regenerator section while removing combustion products from a companion or paired combustor/regenerator section. The roles of the combustor/regenerator sections are reversed by the controls and conduits on alternate cycles. Preferably, the combustor and regenerator zones of each section are stacked, layered or otherwise disposed in plate-like fashion one adjacent the other. This plate-like or layered geometry of the combustor and regenerator zones affords a compact, energy efficient construction. Gas flow between an operating combustor zone and a heat receiving regenerator zone occurs through the work space being heated so that there can be an efficient contribution to heat transfer to the work by convection heating.

The advantages for industrial burner systems employing regeneratively coupled porous body combustors constructed in accordance with the invention include:

(1) relatively low $NO_x$ since the useful temperature limits of the porous body materials to be used are within the flame temperatures below which $NO_x$ generation is quite low;

(2) very high heat transfer rates by radiation to bodies having peak temperatures several hundred degrees F below the porous body surface temperature;

(3) temperatures high enough to use radiant heat input to processes such as melting and super-heating iron and steel;

(4) reaction product flow quiescent enough with appropriate design, to allow stratification of flows between the combustor and the work, thus allowing the possibility of controlling the atmosphere surrounding the work or load by using an injected gas over the work (thereby dispensing with the need for radiant tubes or radiant walls physically separating the fire from the work.)

BRIEF DESCRIPTION OF THE DRAWINGS

FIG. 4 is a schematic isometric view of a cold side of the system of FIG. 3 illustrating an associated gas flow circuit;

DETAILED DESCRIPTION OF THE PREFERRED EMBODIMENTS

Figure 1:
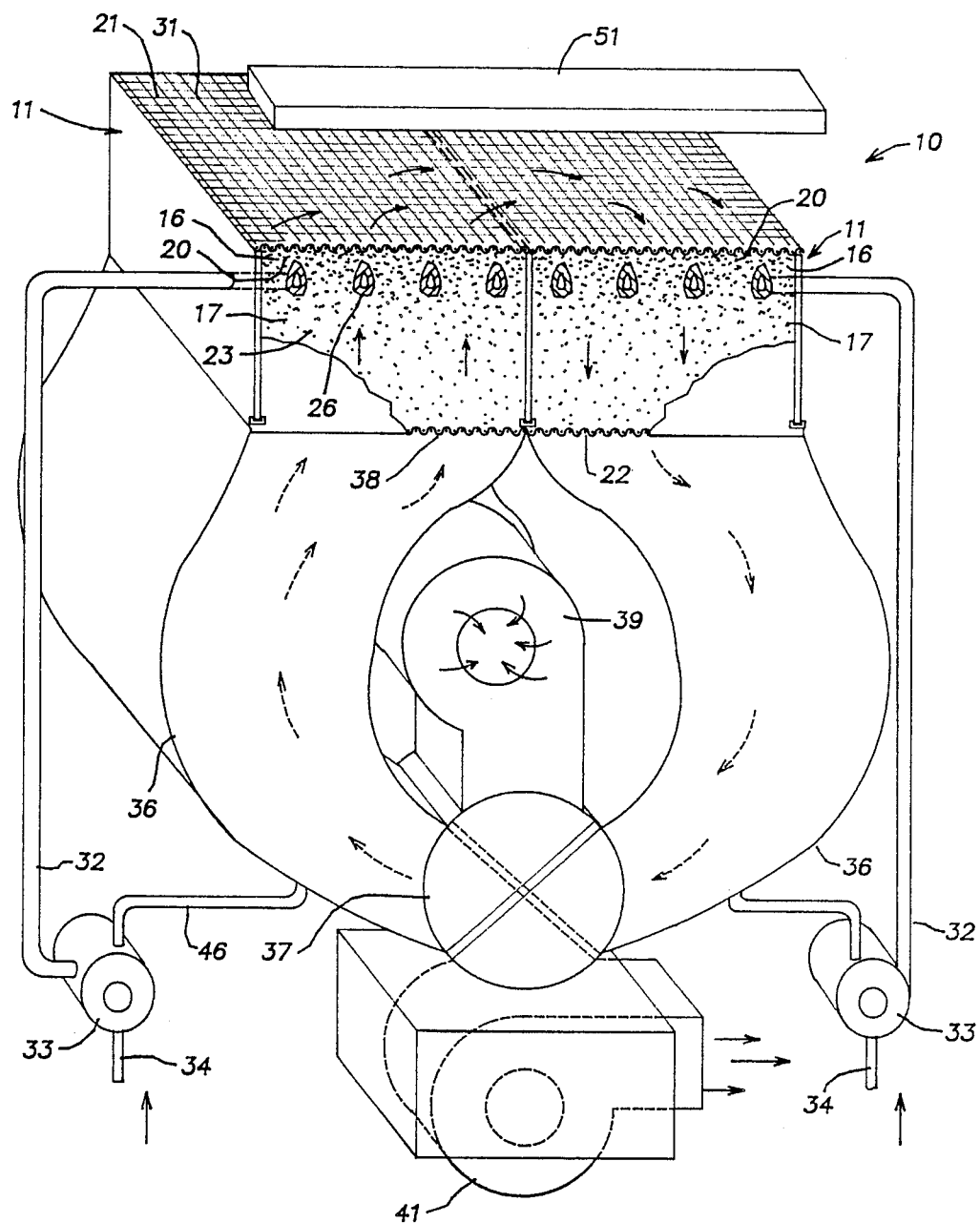
FIG. 1 is an isometric view of a pair of regeneratively coupled porous body combustors constructed in accordance with the invention.

Referring now to the drawings, there is illustrated in FIG. 1, a simplified regeneratively coupled porous body combustor system 10. The system 10 includes a pair of sections 11 which are essentially identical. Each combustor/regenerator unit 11 in the illustrated case is plate-like in character having the configuration of a rectangular parallelepiped and comprising a series of stacked or layered porous zones which comprise a combustor or burner zone 16 and a regenerator zone 17. The term "porous", as used herein, describes a body or a material that allows the passage of air, natural gas or other gaseous or vaporous fuels, and their reaction or combustion products at a flux rate sufficiently high to maintain a desired heat output.

In such usage, the term "porous" describes a solid or solids rigid or otherwise having sufficient distributed voids to allow adequate passage of gas therethrough. Porous material may be in fixed self-supporting form, for example as in a screen, cloth, woven and non-woven matte, apertured plate, joined particles or a reticulated substance and in non-fixed form as in loosely held particles. The illustrated combustor zone 16 includes a layer of high temperature resistant particles or frit 20 such as alumina and a retention screen or apertured plate 21 resistant to high temperature. The frit 20 of the porous combustor zone 16 may have a particle size, for example, ranging from ⅛ inch to ¼ inch and the opening size of the screen 21 is slightly smaller than the selected particle size. The screen 21 can be formed, for example, by known chemical vapor deposition techniques and can be fabricated as an alumina composite with alumina fibers. The porous regenerator zone 17 abuts and is coextensive with the combustor zone 16. The regenerator zone 17 can, for example, comprise a layer of silicon carbide frit 23 in direct contact with the porous combustor zone 16. The regenerator zone 17 also includes a metallic screen 22 for supporting the frit or particles 23.

As will be apparent from the following discussion, the screen 22 is exposed to only moderate temperatures and therefore can be formed of relatively common material such as temperature resistant stainless steel. The aperture size of the retention screen 22 is sufficiently small to prevent escape of the particles 23 of the regenerator zone or layer 17.

Figure 2:
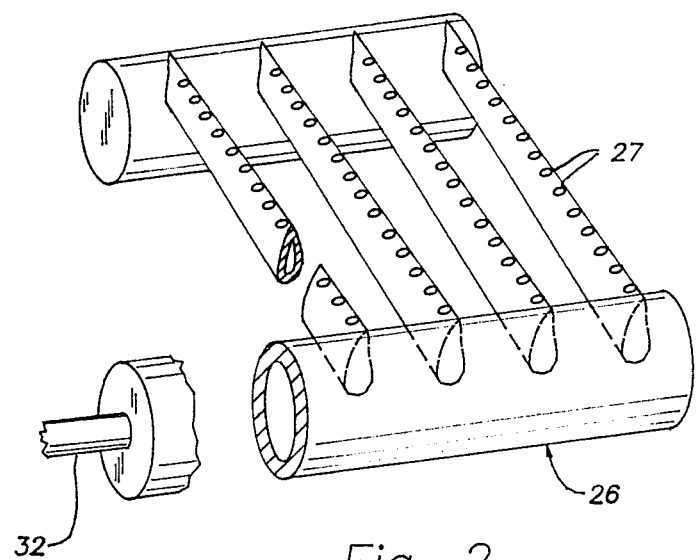
FIG. 2 is an isometric view of a typical fuel distributor manifold employed in the combustor system of FIG. 1.

Gaseous fuel, such as natural gas, is introduced into the combustor zone 16 by a manifold 26 exemplified by the structure illustrated in FIG. 2. The manifold 26 is constructed of suitable material, preferably resistant to relatively high temperatures, such as a ceramic or an alumina composite. In the illustrated case, the manifold 26 has holes 27 drilled or otherwise formed at one side to release gaseous fuel into the combustor porous zone 16. The holes 27 are sufficiently small to prevent entry of the frit or particles 20 constituting the porous combustor zone 16. Other constructions of the fuel distribution manifold 26 are contemplated such as substituting a porous wall in the area of the holes 27. The fuel distribution manifold 26 is arranged with its holes or outlet means 27 within the combustor zone 16 and spaced from an outer or hot surface 31 of the combustor zone 16. It will be noted that this outer hot surface 31 is comprised in part by the screen 21 and in part by the underlying particles 20 of the combustor zone exposed through the apertures in the screen 21. The outlet holes 27 of the manifold 26 are sufficient in number and distribution to ensure that adequate gaseous fuel is supplied uniformly throughout the combustor zone 16 and adequate mixing with air, being supplied in a manner described hereinbelow, is achieved. Gaseous fuel is supplied at suitable pressure to the manifold 26 by a conduit 32 under the automatic control of a valve 33 from a supply line 34.

Air, for its oxygen content, is supplied to the combustor zone 16 by a plenum or conduit 36 leading from a two-position control valve 37. The cross-section of the conduit 36 is substantially coextensive with the cold side, designated 38, of the combustor/regenerator section represented by the porous plate or supporting screen 22. The valve 37 supplies fresh air to the conduit 36 from a supply blower 39 which maintains air pressure in the conduit 36 above atmospheric pressure. Similarly, the valve 37 exhausts gases from the other combustor/regenerator section (on the right in the solid line position of the valve 37 illustrated in FIG. 1) by connecting this section to the intake of a gas exhaust blower 41 through the respective conduit 36. The exhaust blower 41 maintains the pressure of the conduit 36 to which it is connected at a pressure below atmospheric. The illustrated valve 33 controlling gaseous or vaporous fuel flow is of a pilot-operated type, being responsive to the pressure in the associated conduit 36. A pilot line 46 transmits the pressure existing in the conduit 36 as a signal to the valve 33 causing the latter to be opened to supply gaseous fuel when pressure above atmospheric conditions exist in the associated conduit 36. Conversely, when the pressure in the associated conduit 36 is below atmospheric pressure, the valve 33 closes to discontinue supply of gaseous fuel to the respective combustor/regenerator section 11.

The work or load 51 to be heated by the burner system 10 is schematically illustrated in FIG. 1. The hot surface 31 of each combustor unit 11, formed by the respective screens 21 and underlying porous material 20 exposed at the holes of such screen, face the work 51 preferably so that rays normal to these hot surfaces are aimed, to the extent possible, at such work. In the illustrated case, the hot surfaces 31 are substantially flat.

Operation of the combustor/regenerator system 10 is commenced by igniting a combustible mixture of air (or oxygen) and gaseous fuel such as natural gas in one of the combustor/regenerator units 11 by a conventional ignitor (not shown) adjacent the associated eventually hot surface. It will be apparent from the foregoing that air is delivered through the burner cold side 38 and porous regenerator zone 17 by the supply blower 39 through the valve 37. Gaseous fuel is delivered by the associated valve 33 responding to pressure in the respective conduit 36. Combustion occurs in the porous combustor zone 16 and its temperature rises to operational levels.

Combustion continues at the ignited combustor/regenerator section 11 and combustion products are exhausted through the other combustor/regenerator section 11 passing first through the inactive combustor zone 16 and then through the regenerator zone 17. A major portion of the latent heat in the combustion products is absorbed in the regenerator zone 17 of this other combustor/regenerator section 11. When the heat storage capacity of the heat receiving regenerator zone 17 is approached, the roles of the combustor/regenerator sections 11 are reversed. This is accomplished by shifting the position of the air valve 37 under suitable automatic controls from the solid line position to the dotted line position of FIG. 1. The fuel supplying valves 33 similarly change their states in response to the changes of pressure in their respective conduits 36, one discontinuing the supply of fuel and the other beginning the supply of fuel. The combustible gaseous mixture is ignited in the newly activated combustor/regenerator section 11 by the elevated temperature of the porous combustor zone 16 existing as a result of the heating occurring in this zone by the just discontinued flow of combustion products therethrough.

Forced convection currents of the combustion or reaction products exist in the space immediately adjacent the hot sides 31 of the combustor/regenerator sections 11 as such gases travel paths from one face 31 to the other. These currents advantageously contribute to the heating effect on the work-piece or load 51. The combustor/regenerator sections 11 are operated in a manner that keeps their faces 31 in a high temperature domain. This is accomplished by supplying air and gaseous fuel at rates sufficient to replenish the heat given up by radiation at the desired operating temperature. The upper limit of the operating temperature range of these hot surfaces 31 is restricted by the durability of the material forming such surfaces. Temperatures averaging about 2,500° F. can be achieved with commonly used materials. Relatively higher temperatures can be achieved where the screen 21 is made as a composite of alumina and alumina fibers fabricated by chemical vapor deposition techniques. The regenerator zones 17 are capable of absorbing as much as 85% of the latent heat carried in the combustion products so that a relatively high thermal efficiency is exhibited by the disclosed combustor system 10. The disclosed combustor or burner system thus provides high thermal efficiency and high radiant heat output. Where the hot surface 31 of the combustor zone 16 is horizontal or nearly horizontal, the screen 21 can be omitted if the flow rates of gases are maintained at a level sufficiently low to avoid fluidizing the particulate material 20. Where the flow rates of the combustion or reaction products are relatively low, a quiescent state exists in the space between the work 51 and combustor/regenerator sections 11. Under such circumstances the atmosphere surrounding the work 51 can be controlled if necessary by using an injected gas over the work to thereby dispense with the need for radiant tubes or radiant walls to physically separate the fire from the work.

Figure 3:
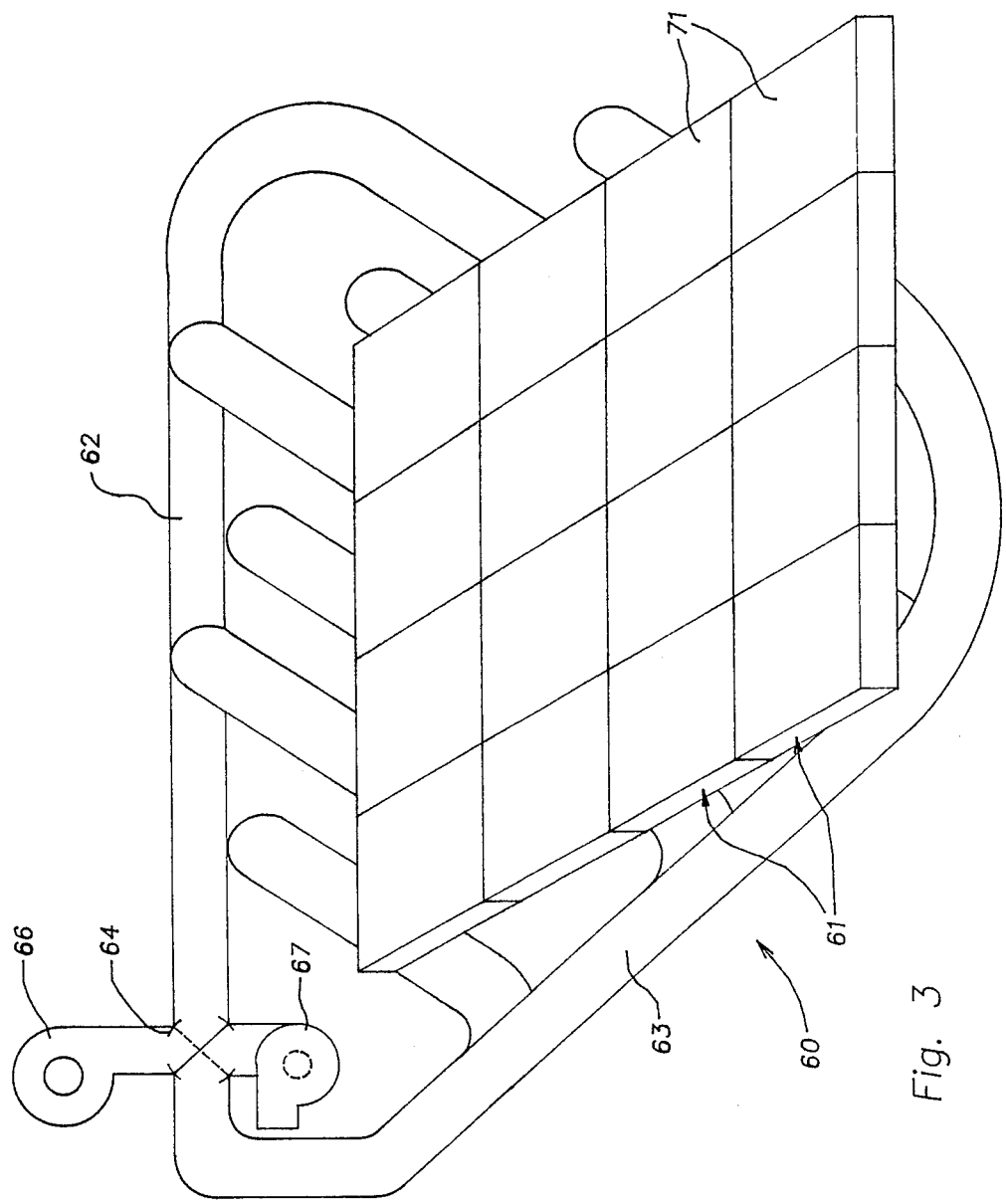
FIG. 3 is a schematic isometric view of a hot side of a multiple set combustor system constructed in accordance with the present invention.

FIGS. 3 and 4 schematically illustrate a combustor/regenerator system 60 that employs multiple sets of regeneratively coupled porous body combustors. FIG. 4 shows the reverse or cold side of the multiple combustor system 60, where alternate rows of combustor/regenerator sections 61 are connected to one conduit assembly or manifold 62 and where intervening rows of combustor/regenerator sections 61 are connected to another conduit assembly or manifold 63. A two-position valve 64 functions like the valve 37 of FIG. 1 to direct fresh air to one manifold 62 and to evacuate combustion products from the other manifold 63. The position of the valve 64 is caused to cycle and alternate the function of the combustor/regenerator sections 11 between active combustion in one mode and regeneration in the other. Supply and exhaust blowers 66, 67 are selectively coupled to the manifolds 62, 63 through the valve 64. Gaseous fuel is supplied to the individual combustor/regenerator sections 61 in essentially the same manner as that described in connection with FIGS. 1 and 2. The individual combustor/regenerator sections 61 can be constructed in essentially the same manner as that described in connection with FIG. 1. Combustion products exiting the hot surfaces, designated 71, of the combustor/regenerator sections actively supporting combustion may flow to each of the adjacent hot surfaces of the combustor/regenerator sections operating in a regenerating mode.

Figure 5:
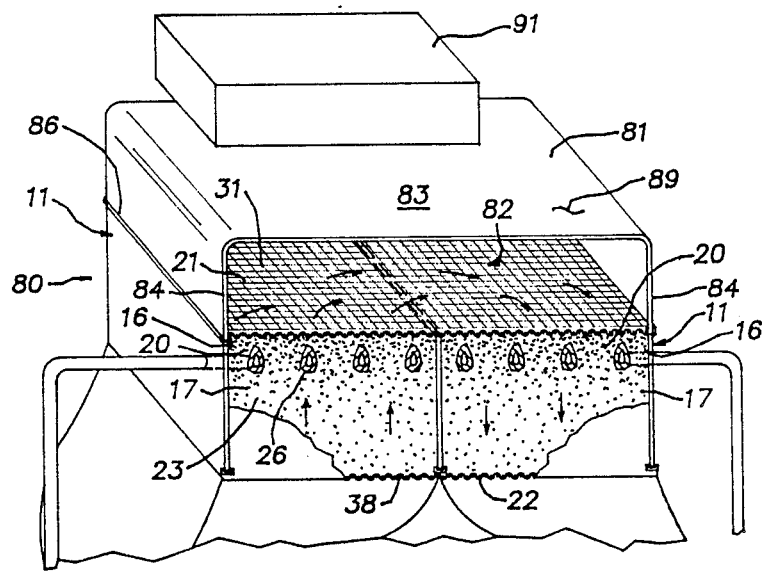
FIG. 5 is an isometric view of a system, of regeneratively coupled combustor units similar to those of FIG. 1 and an associated cover forming a radiant surface burner in accordance with a second embodiment of the invention.
Figure 6:
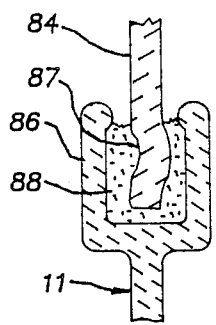
FIG. 6 is a fragmentary view of a joint area of the cover sidewall and a combustor/regenerator unit.

FIG. 5 illustrates an embodiment of the invention forming a radiant surface burner 80 useful in applications where it is desired to isolate combustion gases from the work being heated or the atmosphere surrounding the work. Combustion/regenerator units 11 of the burner 80 include elements like those of the system 10 illustrated in FIG. 1 and where identical such elements have been identified with the same numerals. An impervious box-like cover 81 envelopes the space designated 82 through which combustion products flow from one unit 11 to the other. In the illustrated embodiment, the cover 81 has a major wall 83 which is superposed, parallel and coextensive with both of the hot outer surfaces 31 of the porous zones 16 of the adjacent paired units 11. The cover 81 has four sidewalls 84 (only two are seen in FIG. 5) integrally formed with each other and the major wall 83. The sidewalls 84, as illustrated in FIG. 6, are joined to adjacent grooved edges 86 of the units 11 by a wrinkle 87 locked or captured by suitable cement 88. The cover 81 can be formed of a material such as a ceramic suitable for service at the temperatures at which it will be operated. During operation of the units 11, gas flow is like that explained in connection with FIG. 1. However, the combustion products exiting alternate units 11 are contained by the cover 81 and isolated from the space surrounding the work or load 91. The cover 81 is heated by radiation from the hot faces 31 and convection of the combustion products. The cover 81 reaches a high temperature and radiates the heat received by it from its outer surface 89 to the work 91.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

I claim:

1. A system for producing a high level of radiation heating comprising a pair of adjacent combustor/regenerator sections, each section having a combustor zone formed of a porous body, and means for injecting fuel into said porous body in a manner wherein the fuel is distributed and substantially completely combusted within the porous body, the porous body having a combustor radiant surface area facing a work station, a porous body regenerator associated with each combustor zone, conduit means for conducting combustible gases to each combustor/regenerator section and alternately for conducting combustion products from each combustor/regenerator section, means for cyclically controlling the flow of combustible gases to one combustor/regenerator section and the flow of combustion products from the other combustor/regenerator section and, alternately, the flow of combustible gases to the other section and the flow of combustion products from the one section, each section having its combustor radiant surface area sufficiently open to allow the passage of combustion products through it and the associated porous body regenerator, the porous body regenerator of each section being arranged to allow passage of gas of at least one of the combustible gases therethrough and, alternately, combustion products therethrough, the porous body regenerators having a construction capable of cyclically absorbing a major portion of the heat carried in the combustion products for subsequent transfer to the one combustible gas, the sections being arranged such that the products of combustion from either section are received at the other section, the combustion radiant surface of each section being arranged to radiate a major portion of the heat generated by combustion within the porous body.

2. A system as set forth in claim 1, wherein the porous body regenerator of each section comprises a bed of loose frit-like particles.

3. A system as set forth in claim 1, including a cover enveloping a space adjacent the combustion surfaces of each section, said cover being arranged to isolate the combustion products from the work on a side of the cover opposite that which faces the combustion surface of each section, said cover being adapted to radiate heat received from said combustor/regenerator section to a workpiece.

4. A system as set forth in claim 1, wherein said injection means comprises a manifold for distributing fuel throughout the porous body combustor zone at a multiplicity of locations.

5. A system as set forth in claim 4, including means to supply a combustible gas to an active one of said sections at a pressure above atmospheric pressure.

6. A system as set forth in claim 5, including means to exhaust combustion products from a regenerating one of said sections at a pressure below atmospheric pressure.

7. A system for producing a high level of radiation heating comprising a pair of adjacent combustor/regenerator sections, each section having a combustor surface area facing a work station, a porous body regenerator associated with each combustor surface, conduit means for conducting combustibles gases to each combustor/regenerator section and alternately for conducting combustion products from each combustor/regenerator section, means for cyclically controlling the flow of combustible gases to one combustor/regenerator section and the flow of combustion products from the other combustor/regenerator section and, alternately, the flow of combustible gases to the other section and the flow of combustion products from the one section, each section having its combustor surface area sufficiently open to allow the passage of combustion products through it and the associated porous body regenerator, the porous body regenerator of each section being arranged to allow passage of gas of at least one of the combustible gases therethrough and, alternately, combustion products therethrough, the porous body regenerators having a construction capable of cyclically absorbing a major portion of the heat carried in the combustion products for subsequent transfer to the one combustible gas, the sections being arranged such that the products of combustion from either section are received at the other section, the combustion surface of each section being arranged to radiate a major portion of the heat generated by combustion within its associated structure, the combustor surface being at least partially comprised of frit-like particles.

8. A system as set forth in claim 7, wherein said particles are retained by a rigid screen at a hot side of the combustor.

* * * * *